United States Patent [19]

Audeh

[11] 4,419,456
[45] Dec. 6, 1983

[54] METHOD FOR THE DISPOSAL OF SHOT COKE

[75] Inventor: Costandi A. Audeh, Princeton, N.J.

[73] Assignee: Mobil Oil Corporation, New York, N.Y.

[21] Appl. No.: 344,567

[22] Filed: Feb. 1, 1982

[51] Int. Cl.$^3$ .......................... C01B 3/02; C07C 1/04; C01B 3/06
[52] U.S. Cl. .................................. 518/703; 518/704; 252/373; 48/197 R; 48/206; 48/202
[58] Field of Search ................ 252/373; 518/702–703, 518/704; 48/206

[56] References Cited

U.S. PATENT DOCUMENTS

| | | | |
|---|---|---|---|
| 2,554,263 | 5/1951 | Nelson | 252/373 X |
| 2,631,934 | 3/1953 | Lewis. | |
| 3,684,689 | 8/1972 | Patton et al. | |
| 3,752,658 | 8/1973 | Blaser | 208/127 |
| 4,055,484 | 10/1977 | Blaser et al. | |
| 4,077,869 | 3/1978 | Moritz et al. | |
| 4,099,382 | 7/1978 | Paull et al. | 252/373 X |
| 4,099,383 | 7/1978 | Paull et al. | 252/373 X |
| 4,198,212 | 4/1980 | Tsao. | |
| 4,219,402 | 8/1980 | De George. | |

*Primary Examiner*—Howard T. Mars
*Attorney, Agent, or Firm*—Alexander J. McKillop; Michael G. Gilman; Charles J. Speciale

[57] ABSTRACT

A method for utilizing shot coke which is in the form of hard-to-grind 4 mm spherical particles comprises fluidizing the shot coke particles in a first pressurized reactor vessel and introducing sufficient oxygen and steam to produce a synthetic gas containing carbon monoxide and hydrogen, fluidizing a bed of shot coke particles contained in a second pressurized reactor vessel with the synthetic gas and introducing sufficient oxygen to combust the synthetic fuel and produce water and sufficient heat such that water can react with the shot coke particles to regenerate carbon monoxide and hydrogen. The synthetic gas formed in the second reactor vessel can be recovered at sufficient pressures to drive a power turbine or used to obtain hydrocarbon fuels. A heat recovery system in the second reactor vessel produces steam by indirect heat exchange of the shot coke bed with water. The steam that is generated can be used to supply both the first and second reactor vessels with reactive steam.

9 Claims, 1 Drawing Figure

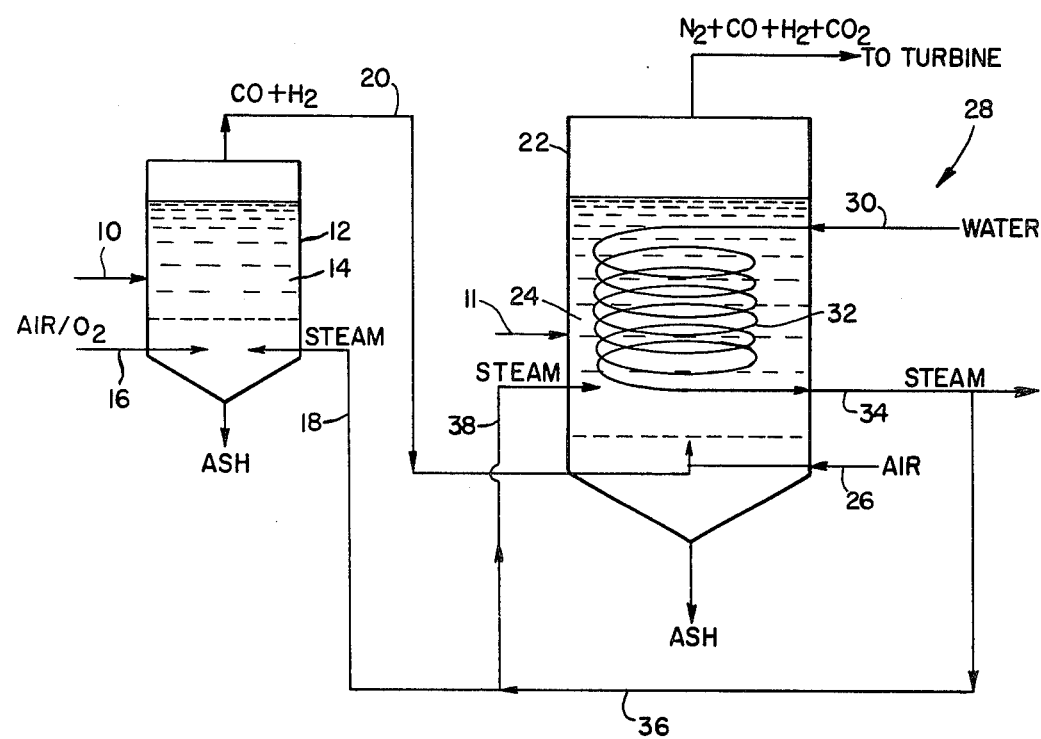

METHOD FOR THE DISPOSAL OF SHOT COKE

BACKGROUND OF THE INVENTION

1. Field of the Invention

This invention relates to the utilization and disposal of shot coke. More particularly, the invention relates to a process of gasifying shot coke and thereby consuming this undesirable component of coke fuels while simultaneously generating steam and producing a pressurized synthetic gas stream.

Shot coke is an undesirable form of coke that is generated intermittently in delayed cokers. Delayed cokers are designed for the manufacture of sponge coke. More specifically, shot coke is an agglomeration of spherical coke particles of uniform size, approximately 4 mm in diameter, in which the spherical coke particles are fused together at their points of contact and embedded in a matrix of finer coke particles to form coke chunks of varying size. These coke chunks have many voids and are permeable. Upon grinding, the coke chunks are easily broken up to yield two types of coke particles, i.e., a powdery coke material and the 4 mm spherical particles of shot coke. Whereas sponge coke manufactured in delayed coking is amenable to grinding, the spherical shot coke particles are not. A standard method for determining ease of grindability of coal is the Hardgrove-Machine method, ASTM D409-71. In this particular test, the larger the resultant numerical value, the easier it is to grind the coke. Sponge coke has a Hardgrove grindability index of about 70. Shot coke has a Hardgrove grindability index of about 20. This inability to be broken into finer particles renders shot coke an undesirable component in sponge coke and if such material can be sold at all, shot coke brings a lower price than the sponge coke.

While the shot coke particles are difficult to grind further, these uniformly sized particles can be readily fluidized. Accordingly, it would be worthwhile to take advantage of the physical properties of the shot coke and, at the same time, eliminate any economic disadvantage associated with the production of this material.

2. Discussion of the Prior Art

It is, of course, well known to gasify coal by introducing oxygen and steam into a fluidized bed of coal particles and thereby produce a synthetic gas comprised of carbon monoxide and hydrogen. For example, in U.S. Pat. No. 4,198,212, issued Apr. 15, 1980, to Tsao, coal is gasified to produce a coal gasification effluent and a char residue. The char residue is cooled by indirect heat transfer in a separate char bed, and the coal gasification effluent is passed through the cool char bed to effect cooling of the coal gasification effluent, with tars and oil present in the effluent being absorbed by the char bed. Further cooling of the char bed is provided by a heat recovery system including the generation of steam by indirect heat exchange with boiler feed water.

Integrated coking and gasification processes are disclosed in U.S. Pat. Nos. 4,055,484, 4,077,869, and 4,219,402 in which separate coking and heating zones and a single gasifying zone are provided. These patents are not concerned with taking advantage of the physical properties of shot coke and finding a useful means of disposing of this otherwise undesirable component in coke fuels.

U.S. Pat. No. 2,903,980, issued Sept. 15, 1959, to Gorin discloses the combustion of finely divided low volatile carbonaceous solid fuels in a two-step combustion process comprising partial incomplete combustion of carbonaceous solids to form char and combustible gases and consuming the combustion products in a polarized fuel burner. Fresh carbonaceous solids may also be introduced into the fuel burner. The Gorin patent is not concerned with the problem of eliminating the economic disadvantage associated with shot coke production and does not disclose an overall combustion process which not only takes advantage of the physical properties of shot coke to dispose of this material, but also takes advantage of the various chemical reactions which take place in accordance with the present invention to produce a pressurized synthetic gas useful to drive power turbines and generate steam and to generate methanol and other hydrocarbons.

SUMMARY OF THE INVENTION

A primary object of the present invention is to provide a method which will gain maximum benefit from shot coke, using such material to best advantage with respect to the uniform, difficult-to-grind and spherical properties thereof and, at the same time, dispose of this material without the previous economic disadvantages associated with the production of shot coke.

Briefly, the present invention involves the following steps which summarize the important features of the present method of shot coke disposal. First, the agglomerated shot coke is crushed and classified to yield two fractions. The first fraction comprises coke particles having a size range of about 40 to about 60 mesh. This finely divided material is separated and can be sold at a premium price because of the small size. The second fraction comprises spherical coke particles approximately 4 mm in diameter and will hereinafter be characterized as shot coke. These larger shot coke particles are saved and treated according to the following procedure. The shot coke is charged into a heated pressurized, fluidizing vessel wherein the coke particles are heated to about 1000°–2000° C. At this elevated temperature, a carefully controlled stream of oxygen sufficient to maintain the bed temperature is introduced along with steam. The amount of steam introduced is sufficient to cause the bed of spherical shot coke particles to become fluidized. In addition, the amount of oxygen and steam introduced is sufficient to generate gaseous products according to reaction (1) with a minimum product formed by reaction (2) as shown below and as well known in the art.

$$C + H_2O \rightarrow CO + H_2 \tag{1}$$

$$C + 2H_2O \rightarrow CO_2 + 2H_2 \tag{2}$$

Although reaction (2) is not favored according to the method of the present invention, some partial contribution to the gasification effluent from reaction (2) is acceptable.

The carbon monoxide and hydrogen gases which are generated leave the pressurized vessel and are introduced into a second pressurized steam generator vessel in which the primary fuel source is fresh shot coke in the form of a fluidized bed. In the steam generator, the desired chemical reactions which take place are as follows:

$$2H_2 + O_2 \rightarrow 2H_2O + \text{heat} \tag{3}$$

$$2CO + O_2 \rightarrow 2CO_2 + \text{heat} \tag{4}$$

$$H_2O + C \rightarrow CO + H_2 \tag{5}$$

In accordance with reactions (3), (4), and (5), as the carbon monoxide and hydrogen gasification effluent from the first reaction vessel enters the steam generator, air is introduced into the steam generator to supply the necessary oxygen for the combustion of the gasification effluent and the generation of the necessary heat for heating the fresh beds of shot coke, reactions (3) and (4). The exothermic reaction yields water and carbon dioxide as the combustion products. Since the bed of shot coke is maintained at elevated temperatures due to the heat generated, the water generated in reaction (3) immediately reacts with the shot coke to regenerate carbon monoxide and hydrogen, reaction (5), thus consuming the shot coke and thereby achieving the primary object of the present invention. The carbon monoxide and hydrogen gases which are generated are further combusted to generate more heat for steam generation which is accomplished by indirect heat exchange between the bed of shot coke and water which is passed therethrough. If the amount of water generated by reaction (3) is not sufficient to allow the forward progress of reaction (5), additional steam may be added.

Inasmuch as the whole system is pressurized, the gaseous effluent which leaves the steam generator may be used to drive turbines for the purpose of electric power generation. Additionally, the effluent may be processed to derive methanol or other hydrocarbons by conventional methods. The steam which is generated by indirect heat exchange between the shot coke and water can be the source of steam for both of the pressurized vessels. It is important to note that the above described method of fluidizing the short coke serves as a preferred example since the properties of the shot coke allow this material to be very advantageously fluidized. The disposal of shot coke, however, may be achieved in accordance with the teachings of the present invention without fluidization.

BRIEF DESCRIPTION OF THE DRAWINGS

The FIGURE is a simplified schematic representation of an embodiment of the present invention.

DETAILED DESCRIPTION OF THE INVENTION

Although current coking practice is to operate under conditions which minimize the formation of shot coke, in some instances this product is generated in sufficient quantities which make disposal thereof difficult and, economically, undesirable. The shot coke which is produced is generally in the form of agglomerated spherical coke particles embedded in a coke matrix. In accordance with the present invention, the agglomerated coke particles are ground in any conventionally used grinding operation. Grinding the coke particles yields two particulate coke fractions. One of these fractions is a finely divided powdery coke which can be sold at a premium. The other fraction comprises the spherical coke particles which are difficult to grind further. These spherical particles or shot coke particles do not bring a premium price. However, the uniform spherical shape and size of shot coke are advantageous for handling purposes and for fluidization in the gasification method set forth by the present invention.

Referring now to the FIGURE, a charge of the spherical shot coke particles which are approximately 4 mm in diameter via line 10 is introduced into pressurized reaction vessel 12 which can be characterized as a fluidized bed gasification reactor. The shot coke particles are produced as described previously by crushing agglomerated coke particles to yield two particle fractions. The one fraction is a powdery coke material which is separated and sold at premium prices. The second fraction of shot coke forms the coke feed via line 10.

The gasification zone within gasification reactor 12 is maintained at a temperature ranging from about 1000° to 2000° C., preferably about 1300° C., and a pressure ranging from about 500 to 1000 psig, preferably at a pressure ranging from about 600 to 900 psig. The temperature of the bed 14 of shot coke is maintained by the introduction of an oxygen-containing gas such as air, commercial oxygen, or air enriched with oxygen via line 16. Preferably, the oxygen content entering reactor 12 via line 16 is about 21 to about 100 percent by volume. Sufficient steam is introduced into the lower portion of reactor 12 via line 18 to fluidize the bed 14 of shot coke and to generate the gaseous fuel products of carbon monoxide and hydrogen in accordance with reactions (1) and (2) previously discussed. The flow rate of steam through line 18 entering gasification reactor 12 depends on the size of the reactor, however, the velocity of the steam in the reactor zone should be at least 7 feet per second. The flow rate of steam through the shot coke bed 14 and bed temperature are such as to maximize the occurrence of reaction (1), although partial contribution to the total product fuel gas from the occurrence of reaction (2) is acceptable.

The product fuel gas containing the hydrogen and carbon monoxide is removed overhead from gasification reactor 12 via line 20 and introduced thereby into the lower portion of a pressurized steam generator vessel 22 which contains a fresh shot coke bed 24 which is fed to vessel 22 via line 11. Air via line 26 is also introduced into the lower portion of steam generator 22 to supply sufficient oxygen for the combustion of the product fuel gas entering via line 20 and, optionally, fluidize shot coke bed 24. Air enters steam generator 22 at a flow rate that will depend on the size of the vessel, but should be sufficient to achieve full combustion of the fuel gas.

The combustion reactions of hydrogen and carbon monoxide with the oxygen contained within the air stream are set forth in reactions (3) and (4). The exothermic combustion reactions maintain shot coke bed 24 at a temperature of about 1000° to about 2000° C., preferably about 1200° C., sufficiently hot that the water generated in reaction (3) immediately reacts with the shot coke in bed 24 to regenerate a fuel gas containing carbon monoxide and hydrogen. The shot coke is thus consumed. The fuel gas which is regenerated in steam generator 22 is further combusted with the added oxygen to generate more heat for steam generation via reaction (3) and for producing steam via a heat recovery system generally indicated by reference numeral 28. Heat recovery system 28 includes a source of feed water via line 30 which is circulated through cooling coil 32 maintained in shot coke bed 24. The circulation of water in coil 32 results in the heating of the feed water and the recovery of heat from the combustion of the fuel gas to generate steam which exits steam generator 22 via high pressure steam line 34. In general, heat recovery system 28 generates steam at a temperature in the order from about 300° to about 450° F. and at a pressure in the order of about 70 to about 450 psig.

The steam which is produced in heat recovery system 28 can be recovered from line 34 via line 36 and introduced into various points in the method of the present invention. For example, if the amount of water generated by reaction (3) in steam generator 22 is not sufficient to allow reaction (5) to proceed, steam from line 36 may be added to steam generator 22 via line 38. Additionally, steam introduced into gasification reactor 12 via line 18 may be supplied via line 36 from steam produced in heat recovery system 28.

The pressure maintained within steam generator 22 ranges from about 450 to about 900 psig. Accordingly, the exhaust gases which are produced and which contain carbon monoxide and hydrogen formed by reaction (5) as well as nitrogen and carbon dioxide gas is recovered from overhead of steam generator 22 at pressures ranging from about 400 to about 850 psig. The pressurized gaseous effluent may be used to drive turbines for the purpose of generating electric power. Additionally, the gaseous effluent may be manufactured into methanol or higher hydrocarbons such as by a Fischer-Tropsch process.

While the physical properties of shot coke are advantageous in respect to the ability of this material to be easily fluidized, it is important to note that the shot coke beds in gasification reactor 12 and steam generator 22 need not be fluidized in order to achieve the objectives of the present invention of disposing of shot coke. The two-step method of combusting this material according to reactions (1) through (5) allow the disposal of this previously undesirable material and eliminates the prior economic disadvantage as in accordance with the present invention a pressurized fuel stream as well as process steam can be generated as the shot coke is consumed.

Numerous modifications and variations of the present invention are possible in light of the above teachings and, therefore, within the scope of the appended claims, the invention may be practiced otherwise than as particularly described.

What is claimed is:

1. A method for the disposal and utilization of shot coke in the form of hard-to-grind spherical particles of approximately 4 mm in diameter and having a Hardgrove grindability index of about 20 determined by the Hardgrove machine method ASTM D409-71 comprising:

A. contacting a first fluidized bed consisting essentially of said shot coke at elevated temperatures with oxygen and sufficient steam so as to produce a gaseous fuel product comprising a major amount of carbon monoxide and hydrogen, and B. introducing said gaseous fuel product and oxygen into a second fluidized bed consisting essentially of shot coke, said oxygen being supplied in sufficient amount to combust the hydrogen to form water and to react with said hydrogen and carbon monoxide to yield heat to maintain the second bed of shot coke sufficiently hot to allow the regeneration of carbon monoxide and hydrogen by reaction of the shot coke in said second bed and the water formed in the second bed of shot coke.

2. The method of claim 1 wherein said second bed of shot coke is contained within a pressurized vessel and a gaseous effluent comprising regenerated carbon monoxide and hydrogen is recovered at a pressure ranging from about 400 to 850 psig from overhead said vessel.

3. The method of claim 1 wherein said first bed of shot coke is fluidized by said steam.

4. The method of claim 1 further comprising forming steam from said second bed of shot coke by indirect heat exchange with water passing through said second bed of shot coke.

5. The method of claim 4 wherein said steam formed by indirect heat exchange is introduced into said first and second beds of shot coke.

6. The method of claim 1 wherein said first bed of shot coke is maintained at a temperature of about 1000°–2000° C.

7. The method of claim 6 wherein said second bed of shot coke is maintained at a temperature of about 1000°–2000° C.

8. The method of claim 2 wherein said gaseous effluent is directed to a power turbine.

9. The method of claim 2 wherein said gaseous effluent is processed to form hydrocarbons by a Fischer-Tropsch process.

* * * * *